US 12,305,355 B2

(12) United States Patent
Komori (10) Patent No.: US 12,305,355 B2
(45) Date of Patent: May 20, 2025

(54) DRIVE DEVICE AND CONSTRUCTION MACHINE

(71) Applicant: Nabtesco Corporation, Tokyo (JP)

(72) Inventor: Etsuro Komori, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 325 days.

(21) Appl. No.: 17/967,580

(22) Filed: Oct. 17, 2022

(65) Prior Publication Data

US 2023/0160173 A1      May 25, 2023

(30) Foreign Application Priority Data

Nov. 22, 2021   (JP) ................................. 2021-189635
May 20, 2022   (JP) ................................. 2022-083048

(51) Int. Cl.

| | |
|---|---|
| *E02F 3/42* | (2006.01) |
| *E02F 3/32* | (2006.01) |
| *E02F 9/22* | (2006.01) |
| *F15B 15/20* | (2006.01) |
| *F16H 1/46* | (2006.01) |

(52) U.S. Cl.
CPC ................ *E02F 3/425* (2013.01); *E02F 3/32* (2013.01); *E02F 9/2271* (2013.01); *F15B 15/20* (2013.01); *F16H 1/46* (2013.01)

(58) Field of Classification Search
CPC .......... E02F 9/006; E02F 9/2271; E02F 3/425
See application file for complete search history.

(56) References Cited

U.S. PATENT DOCUMENTS

| | | | |
|---|---|---|---|
| 3,677,426 A | 7/1972 | Luck | |
| 9,074,586 B2 * | 7/2015 | Dueckinghaus | ...... F03C 1/0639 |
| 10,066,484 B2 * | 9/2018 | Kato | ..................... F03C 1/0668 |
| 2017/0198730 A1 | 7/2017 | Owada et al. | |

FOREIGN PATENT DOCUMENTS

| | | | | |
|---|---|---|---|---|
| DE | 19926993 C2 * | 4/2001 | ................ | F04B 1/16 |
| JP | 2020-204172 A | 12/2020 | | |
| WO | WO-2010122951 A1 * | 10/2010 | ............ | E02F 9/2232 |
| WO | 2015/186414 A1 | 12/2015 | | |

OTHER PUBLICATIONS

Extended European Search Report dated Mar. 15, 2023, issued in corresponding European Patent Application No. 22201375.7 (5 pgs.).

* cited by examiner

*Primary Examiner* — Abiy Teka
(74) *Attorney, Agent, or Firm* — Pillsbury Winthrop Shaw Pittman, LLP (57) ABSTRACT

The drive unit according to the present disclosure includes two fluid motors serving as drive sources for generating rotational forces, and a channel member having a supply channel for supplying a pressure fluid to the two fluid motors. Each of the two fluid motors includes: a casing having a supply port and a discharge port for the pressure fluid; a drive shaft rotatably supported to the casing; and a motive power generating unit provided in the casing and configured to rotate the drive shaft with the pressure fluid, the pressure fluid being supplied through the supply port and discharged through the discharge port. The two fluid motors are arranged such that the respective drive shafts are disposed parallel to each other and oriented toward opposite sides along rotation axes of the drive shafts. The supply channel supplies the pressure fluid to the supply ports of the two fluid motors.

8 Claims, 5 Drawing Sheets

DRIVE DEVICE AND CONSTRUCTION MACHINE

CROSS-REFERENCE TO RELATED APPLICATIONS

This application is based on and claims the benefit of priority from Japanese Patent Application Serial Nos. 2021-189635 (filed on Nov. 22, 2021) and 2022-083048 (filed on May 20, 2022), the contents of which are incorporated herein.

TECHNICAL FIELD

The present disclosure relates to a drive device and a construction machine.

BACKGROUND

Construction machines such as an excavator includes a self-propelled undercarriage and a slewable upper structure provided on top of the undercarriage. See, for example, Patent Literature 1: Japanese Patent Application Publication No. 2020-204172. The slewable upper structure includes a cab for an operator. One end of an operating unit is rotatably (swingably) coupled to the slewable upper structure. The operating unit includes, for example, a boom, an arm rotatably coupled to the boom, and a bucket rotatably coupled to the arm. One end of the boom is rotatably coupled to the slewable upper structure. One end of the arm is rotatably coupled to the other end of the boom (the end facing away from the slewable upper structure). The bucket is rotatably coupled to the other end of the arm (the end facing away from the boom).

In many cases, a hydraulic actuator having a linear motion mechanism is provided as a drive device in the coupling portion between the slewable upper structure and the boom, the coupling portion between the boom and the arm, and the coupling portion between the arm and the bucket. Driving the hydraulic actuators can cause the slewable upper structure to rotate relative to the undercarriage and cause the boom, arm, and bucket to swing.

Each coupling portion of a construction machine tends to be heavily loaded depending on its service environment. Therefore, for coupling portions of a construction machine, there has been a demand to equalize the rotational driving forces transmitted to the opposite ends in the rotation axis direction. In particular, when rotary actuators and speed reducers are mounted on both sides of the coupling portion in the rotation axis direction, a difference in load sharing could occur due to the phase difference, resulting in the undesired unevenness of the rotational forces. Therefore, there has been an issue to alleviate this drawback.

SUMMARY

The present disclosure provides a drive device and a construction machine capable of alleviating the difference in the load sharing and ensuring sufficient operation stability and excellent controllability.

(1) A drive device according to one aspect of the present disclosure comprises: two fluid motors serving as drive sources for generating rotational forces; and a channel member having a supply channel for supplying a pressure fluid to the two fluid motors. Each of the two fluid motors includes: a casing having a supply port and a discharge port for the pressure fluid; a drive shaft rotatably supported to the casing; and a motive power generating unit provided in the casing and configured to rotate the drive shaft with the pressure fluid, the pressure fluid being supplied to the motive power generating unit through the supply port and discharged from the motive power generating unit through the discharge port. The two fluid motors are arranged such that the respective drive shafts are disposed parallel to each other and oriented toward opposite sides along rotation axes of the drive shafts. The supply channel supplies the pressure fluid to the supply ports of the two fluid motors. The channel member includes two separated supply channels into which the supply channel on a common supply source side is separated.

With this configuration, the drive shafts of the two fluid motors are oriented outward, such that the two fluid motors are opposed to each other in a direction along the rotation axes. This enables the rotational driving force to be shared between both sides. In addition, the pressure fluid can be separated by the separated supply channels and supplied to the associated fluid motors. Therefore, the rotational driving forces are balanced between the two fluid motors, such that differences in load sharing can be inhibited from occurring, and the loads can be equalized between both sides.

(2) The drive device may further comprise two reduction units each including an input portion and an output shaft, the input portion being coupled to associated one of the two fluid motors, the output shaft being configured to decelerate rotation of the input portion and output the decelerated rotation. The two reduction units may be arranged such that respective rotation axes are coaxial, and the two reduction units may be spaced apart from each other.

(3) The drive shafts of the two fluid motors may be coaxial. The supply ports of the two fluid motors may be opposed to each other along the rotation axes of the drive shafts.

(4) The channel member may serve as a part of the casings of the two fluid motors.

(5) A construction machine according to an aspect of the present disclosure comprises: a first member having two fluid motors serving as drive sources for generating rotational forces; a second member coupled to the first member so as to be rotatable about a rotation axis; two reduction units; and a channel member. Each of the two fluid motors includes: a casing having a supply port and a discharge port for the pressure fluid; a drive shaft rotatably supported to the casing; and a motive power generating unit provided in the casing and configured to rotate the drive shaft with the pressure fluid, the pressure fluid being supplied to the motive power generating unit through the supply port and discharged from the motive power generating unit through the discharge port. The two reduction units each have a main axis coaxial with the rotation axis, the two reduction units are spaced apart from each other in a direction along the rotation axis, and the two reduction units are configured to transmit the rotational forces from the two fluid motors to the second member. The channel member is disposed between the two reduction units in the direction along the rotation axis, the channel member is disposed between the two fluid motors in the direction along the rotation axis, and the channel member has a supply channel for supplying the pressure fluid to the two fluid motors. The supply channel supplies the pressure fluid to the supply ports of the two fluid motors. The channel member includes two separated supply channels into which the supply channel on a common supply source side is separated. The supply ports of the two fluid motors are opposed to each other along rotation axes of the drive shafts.

With this configuration, the drive shafts of the two fluid motors are oriented outward, such that the two fluid motors are opposed to each other in a direction along the rotation axes. This enables the rotational driving force to be shared between both sides. Thus, the outputs of the reduction units can be shared between both sides, irrespective of the phase difference occurring in mounting the fluid motors and the reduction units on both sides in the axial direction. In addition, the pressure fluid can be separated by the separated supply channels and supplied to the associated fluid motors. Therefore, the rotational driving forces are balanced between the two fluid motors, such that differences in load sharing can be inhibited from occurring, and the loads can be equalized between both sides. Thus, the outputs of the reduction units are balanced between both sides, such that differences in load sharing can be inhibited from occurring, and the loads can be equalized between both sides. Accordingly, the stability and efficiency in operation of the operating unit can be increased.

(6) The construction machine may further comprise: a self-propelled undercarriage; a slewable upper structure provided on top of the undercarriage via a slewing mechanism and configured to slew relative to the undercarriage; and an operating unit provided on and coupled to the slewable upper structure so as to be rotatable by a rotating unit about a first rotation axis extending in a horizontal direction. The operating unit may include a plurality of members coupled to each other so as to be rotatable by the rotating unit about a rotation axis parallel to the first rotation axis, and the first member and the second member may be selected from the plurality of members coupled to each other by the rotating unit.

According to the present disclosure, the outputs of the reduction units can be shared between both sides, and differences in load sharing can be inhibited from occurring, irrespective of the phase difference occurring in mounting the fluid motors and the reduction units on both sides in the axial direction. Therefore, it is possible to provide a drive device and a construction machine with increased stability and efficiency in operation.

DESCRIPTION OF THE EMBODIMENTS

The following describes a drive device and a construction machine relating to a first embodiment of the disclosure with reference to the accompanying drawings.

First Embodiment

<Excavator>

Figure 1:
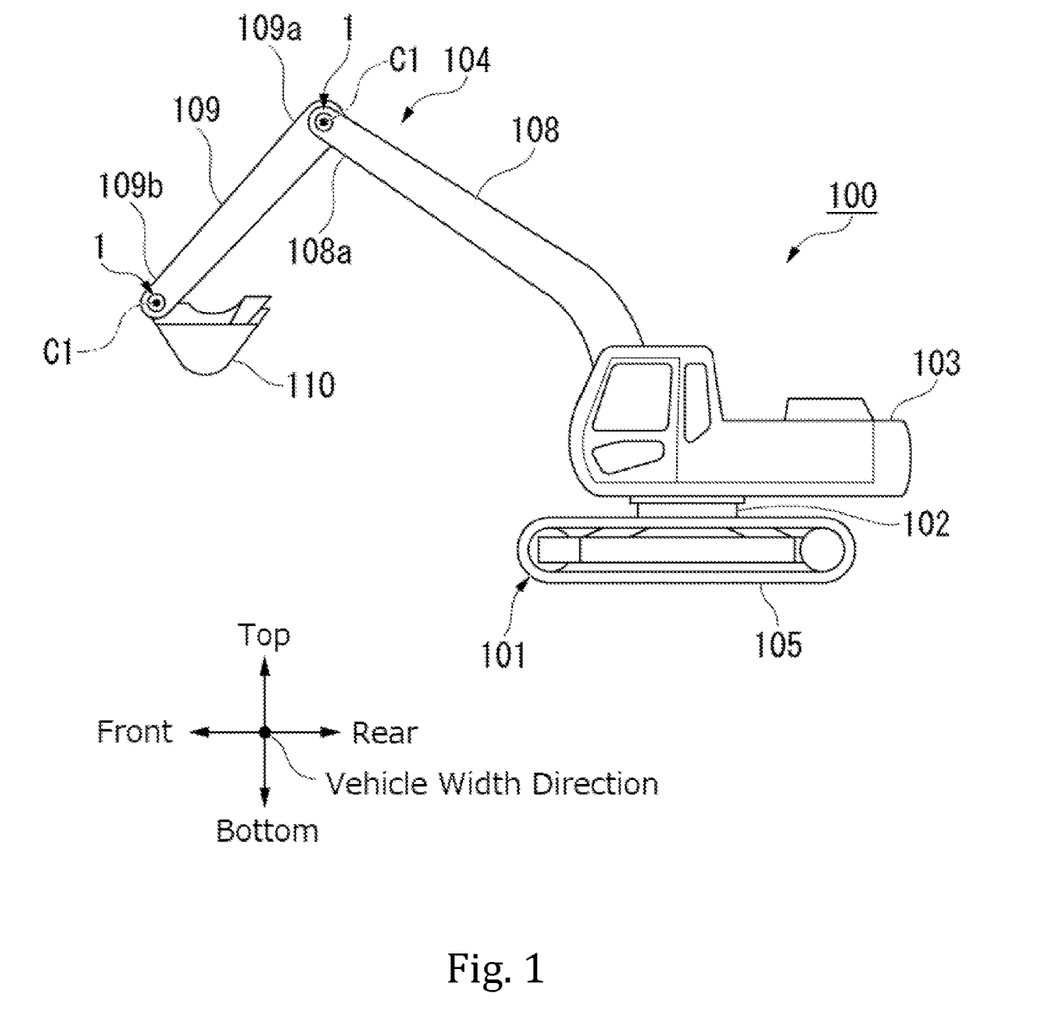
FIG. 1 schematically illustrates a configuration of an excavator according to a first embodiment of the present disclosure, viewed from the side.

FIG. 1 schematically illustrates an excavator 100, which is an embodiment of a construction machine according to one aspect of the disclosure, viewed from the side. In the following description, an operator for operating the excavator 100 is supposed to sit in the driver's cab of the excavator 100 in the state shown in FIG. 1. The direction toward which the operator is facing is herein referred to simply as the front. The opposite side to the front in the horizontal direction is referred to as the rear. The upper and lower directions for the excavator 100 placed on a road surface are simply referred to as the vertical direction. Further, the direction orthogonal to the front-rear direction and the vertical direction is referred to as the vehicle width direction. FIG. 1 shows the excavator 100 as viewed from the vehicle width direction.

As shown in FIG. 1, the excavator 100 includes a self-propelled undercarriage 101, a slewable upper structure 103 that is provided on top of the undercarriage 101 via a slewing mechanism 102 and slews or rotates relative to the undercarriage 101, and an operating unit 104 provided on the slewable upper structure 103. The undercarriage 101 and the slewing mechanism 102 are driven, for example, by an unshown electric motor with a speed reducer. The undercarriage 101 includes, for example, two continuous tracks 105 arranged side by side in the vehicle width direction. This configuration is not limitative, and it is also possible to use wheels or the like instead of the continuous tracks 105. The slewable upper structure 103 is provided with a pressure oil source (e.g., a hydraulic pump) for supplying a pressure fluid used as a working fluid. The slewable upper structure 103 and the operating unit 104 are driven by the hydraulic oil (pressure oil) discharged from the pressure oil source.

The operating unit 104 includes a boom 108 and an arm 109 both extending in the front-rear direction, and a bucket 110. The boom 108, the arm 109, and the bucket 110 are coupled to each other via a drive device 1 so as to be rotatable about a first rotation axis C1. The first rotation axis C1 extends in the horizontal direction. Specifically, one end of the boom 108 in the longitudinal direction is coupled to the slewable upper structure 103 via the drive device 1 so as to be rotatable about the first rotation axis (one example of the rotation axis recited in the claims). FIG. 1, however, does not show the one end of the boom 108 and the drive device 1 provided on that end. The operating unit 104 does not necessarily include the bucket 110 but may include any other attachment selected and connected for use in construction works.

The other end 108a of the boom 108 in the longitudinal direction is coupled to one end 109a of the arm 109 in the longitudinal direction via the drive device 1 such that the arm 109 is rotatable about the first rotation axis C1. The other end 109b of the arm 109 is coupled to the bucket 110 via the drive device 1 such that the bucket 110 is rotatable about the first rotation axis C1. All of the drive devices 1 provided in the coupling portions have the same configuration. Therefore, in the following description, only the drive device 1 that couples the bucket 110 to the other end 109b of the arm 109 will be described, and description of the other drive devices 1 will be hereunder omitted.

Figure 2:
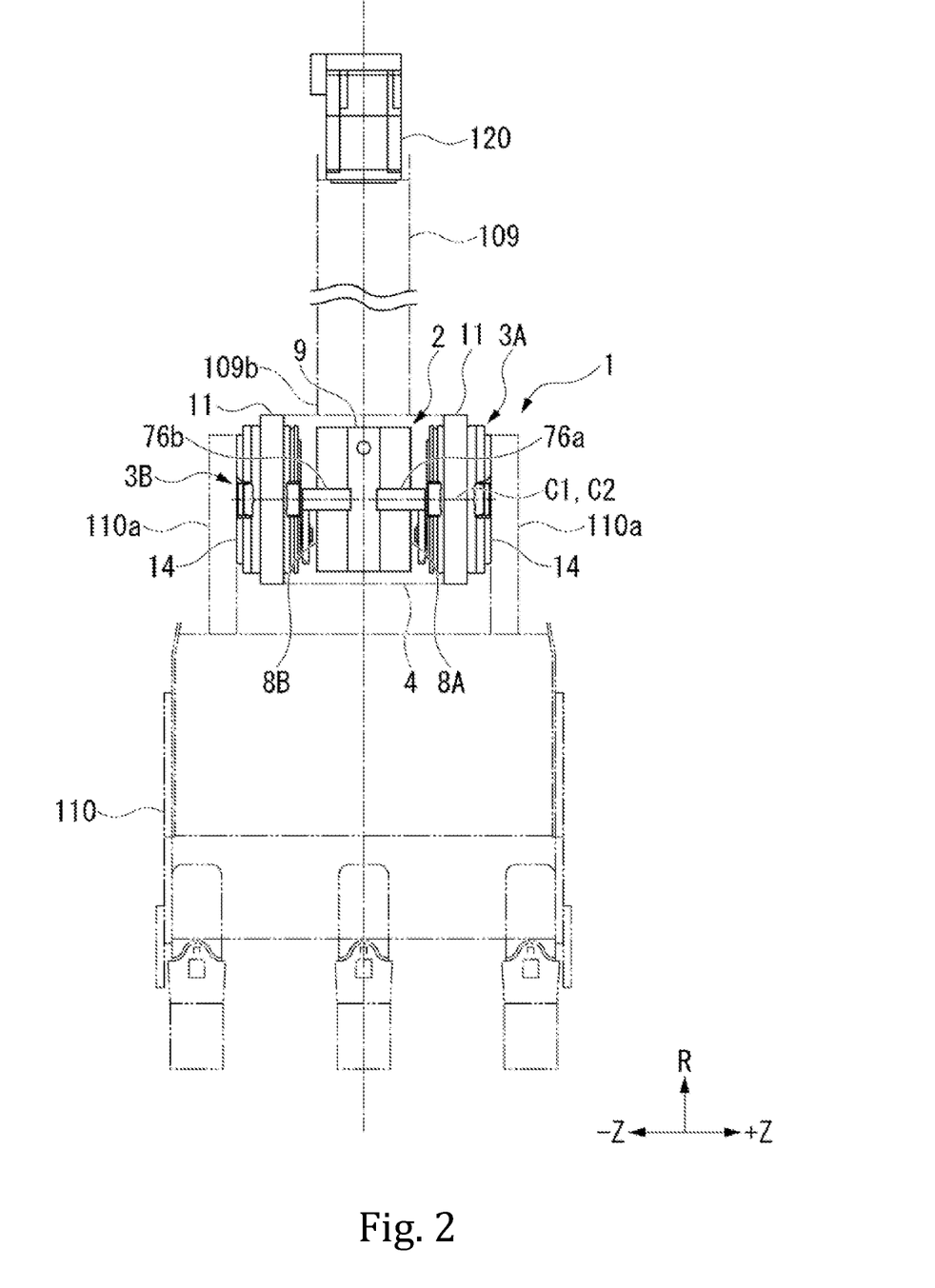
FIG. 2 schematically illustrates details of a drive device in a coupling portion between an arm and a bucket according to the first embodiment of the disclosure.

FIG. 2 schematically illustrates the details of the coupling portion between the arm 109 and the bucket 110. In FIG. 2, the arm 109 and the bucket 110 are drawn with dashed-two dotted lines for ease of understanding. As shown in FIG. 2, the drive device 1 is provided on the other end 109b of the arm 109. The drive device 1 includes hydraulic motors 8A, 8B serving as the drive source, and the rotational driving force of the hydraulic motors (fluid motors) 8A, 8B is transmitted to the bucket 110. The arm 109 is an example of the first member recited in the claims. The bucket 110 is an example of the second member recited in the claims.

<Drive Device>

The drive device 1 is disposed on the first rotation axis C1 of the bucket 110 relative to the arm 109. The drive device 1 is interposed between attachment brackets 110a of the bucket 110 arranged on the first rotation axis C1. With the attachment brackets 110a fixed to the drive device 1, the bucket 110 is rotatable about the first rotation axis C1 relative to the arm 109. The first rotation axis C1 is oriented horizontally so as to be orthogonal to the longitudinal direction of the arm 109.

The drive device 1 includes two hydraulic motors 8A, 8B and two reduction units. The two hydraulic motors 8A, 8B are contained in a housing 4 fixed to the other end 109b of the arm 109. The two reduction units, namely, a first reduction unit 3A and a second reduction unit 3B, are disposed on opposite sides of the hydraulic motors 8A, 8B. The first and second reduction units 3A, 3B are connected to the hydraulic motors 8A, 8B, respectively. The two hydraulic motors 8A, 8B are driven with the hydraulic oil supplied from the pressure oil source (e.g., a hydraulic pump) provided, for example, in the slewable upper structure 103. The hydraulic motors 8A, 8B have drive shafts 76a, 76b, respectively, that rotate about a second rotation axis C2. The second rotation axis C2 extends horizontally so as to be orthogonal to the longitudinal direction of the arm 109.

The second rotation axis C2, which is the main axis of the first and second reduction units 3A, 3B, is coaxial with the first rotation axis C1. In other words, the rotation axis of the first and second reduction units 3A, 3B is the second rotation axis C2 coaxial with the first rotation axis C1 which is the rotation axis of the bucket 110. In this embodiment, the second rotation axis C2 and the first rotation axis C1 form a common axis. In the following description, the direction parallel to the first rotation axis C1 may be referred to as an axial direction, the circumferential direction around the first rotation axis C1 may be referred to as a circumferential direction, and the direction orthogonal to the axial direction and the circumferential direction may be referred to as a radial direction.

The drive device 1 includes the first reduction unit (reduction unit) 3A, the first hydraulic motor (hydraulic motor) 8A, the second hydraulic motor (hydraulic motor) 8B, and the second reduction unit (reduction unit) 3B arranged from the right side to the left side in FIG. 2 along the first rotation axis C1 or the second rotation axis C2. The first reduction unit 3A, the first hydraulic motor 8A, the second hydraulic motor 8B, and the second reduction unit 3B are all coaxially arranged. The rotating shafts of the first reduction unit 3A, the first hydraulic motor 8A, the second hydraulic motor 8B, and the second reduction unit 3B are separate members divided in the axial direction. A channel member 9 is disposed between the first hydraulic motor 8A and the second hydraulic motor 8B in the direction along the second rotation axis C2. The first hydraulic motor 8A and the second hydraulic motor 8B are arranged symmetrically with respect to the channel member 9, and the first reduction unit 3A and the second reduction unit 3B are arranged symmetrically with respect to the channel member 9. In the following description, the first hydraulic motor 8A and the second hydraulic motor 8B may be referred to simply as the hydraulic motor 8A and the hydraulic motor 8B, respectively. Likewise, the first reduction unit 3A and the second reduction unit 3B may be referred to simply as the reduction unit 3A and the reduction unit 3B, respectively.

Figure 3:
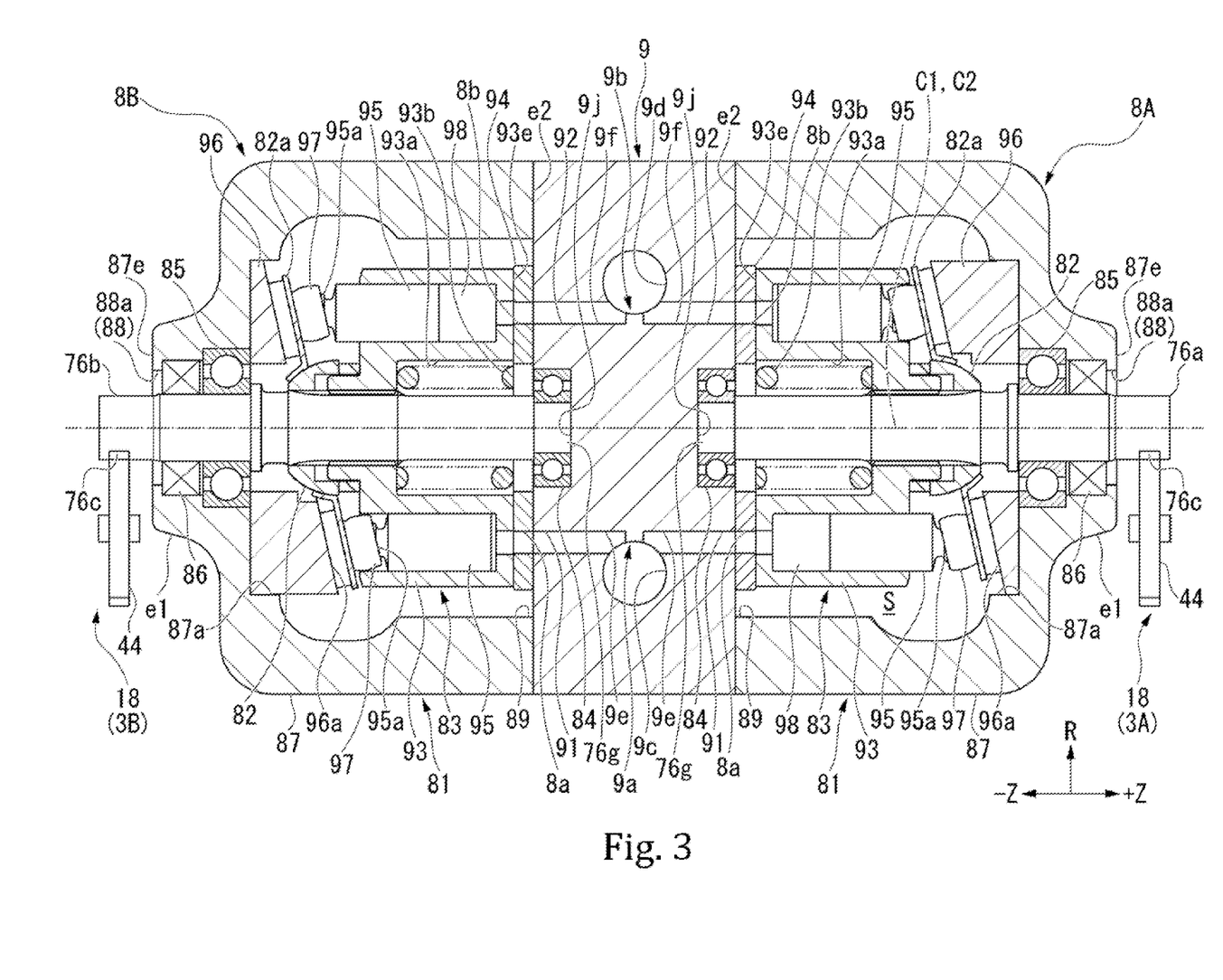
FIG. 3 schematically illustrates a configuration of a hydraulic motor according to the first embodiment of the disclosure.

As shown in FIG. 3, the channel member 9 has a supply channel 9c and a discharge channel 9d formed therein. The supply channel 9c is used to supply the hydraulic oil from the pressure oil source (e.g., a hydraulic pump) to the hydraulic motor 8A and the hydraulic motor 8B, and the discharge channel 9d is used to return the hydraulic oil discharged from the hydraulic motor 8A and the hydraulic motor 8B to the pressure oil source. The channel member 9 also serves as a casing 81 that forms the back sides of the hydraulic motor 8A and the hydraulic motor 8B, as will be described later. In other words, the hydraulic motor 8A and the hydraulic motor 8B are connected to each other on their back sides via the channel member 9. The hydraulic motor 8A and the hydraulic motor 8B are disposed such that their respective back sides are opposed to each other in the direction along the first rotation axis C1 or the second rotation axis C2.

The hydraulic motor 8A is connected to the reduction unit 3A, such that the rotational driving force of the hydraulic motor 8A is transmitted via the reduction unit 3A to the attachment bracket 110a on the right side shown in FIG. 2 with a reduced speed. Likewise, the hydraulic motor 8B is connected to the reduction unit 3B, such that the rotational driving force of the hydraulic motor 8B is transmitted via the reduction unit 3B to the attachment bracket 110a on the left side shown in FIG. 2 with a reduced speed. The hydraulic motor 8A and the hydraulic motor 8B are arranged on the second rotation axis C2 so that the drive shaft 76a and the drive shaft 76b project toward opposite sides. The drive shaft 76a of the hydraulic motor 8A projects to the right in FIG. 2 and transmits the rotational driving force to the reduction unit 3A. The drive shaft 76b of the hydraulic motor 8B projects to the left in FIG. 2 and transmits the rotational driving force to the reduction unit 3B.

<Hydraulic Motors>

The hydraulic motors of the embodiment will now be described with reference to the drawings. In the following description, components having the same or like functions are denoted by the same reference signs. Description of such components may not be herein repeated.

The following describes the definition of the +Z direction, the −Z direction, and the R direction. The +Z direction is an example of the first rotation axis direction, and as shown in FIG. 2, the drive shaft 76a of the hydraulic motor 8A projects in this direction. Thus, the +Z direction is the direction along the first rotation axis C1 of the drive shaft 76a. The −Z direction is the direction opposite to the +Z direction and is an example of the first rotation axis direction. The drive shaft 76b of the hydraulic motor 8B projects in the −Z direction. The R direction is an example of a radial direction orthogonal to the first rotation axis C1. The R direction is the direction intersecting (e.g., substantially orthogonal to) the +Z direction and the −Z direction. For example, the R direction is the longitudinal direction of the arm 109.

The following describes the definition of one example of installation of the hydraulic motors 8A, 8B. In one example of installation of the hydraulic motors 8A, 8B, the +Z direction is oriented toward the right (the state shown in FIGS. 2 and 3). The installation of the hydraulic motors 8A, 8B is not limited to this case.

FIG. 3 shows an example of configuration of the hydraulic motors 8A, 8B of the embodiment. The configurations of the two hydraulic motors 8A, 8B are the same. Further, the two hydraulic motors 8A, 8B are arranged in line symmetry with each other in the direction along the first rotation axis C1 and the second rotation axis C2 with respect to the center of the other end 109b of the arm 109. Therefore, in the following description, basically only the first hydraulic motor 8A will be described, and redundant description of the second hydraulic motor 8B will be hereunder omitted. For the second hydraulic motor 8B, the +Z direction and the −Z direction referred to in the description of the first hydraulic motor 8A should be interchanged.

As shown in FIG. 3, the hydraulic motor 8A includes a casing 81, a drive shaft 76a for outputting a rotational power, a motive power generating unit 83 for providing the rotational power to the drive shaft 76a, bearings 84, 85 that rotatably support the drive shaft 76a and the motive power generating unit 83, and an oil seal 86 that seals the casing 81.

A description is given of the casing 81. The casing 81 is made of a metal, for example. The casing 81 forms the most part of the contour of the hydraulic motor 8A. The casing 81 is formed by combining a first casing member (housing) 87 having a substantially bottomed cylindrical shape and a second casing member (cover) 9 having a substantially plate-like shape. The second casing member 9 is formed of the channel member described above. The second casing member (channel member) 9 is used as a common cover for closing the respective second openings 89 of the first casing member 87 of the hydraulic motor 8A and the first casing member 87 of the hydraulic motor 8B. The first casing member 87 of the hydraulic motor 8A and the first casing member 87 of the hydraulic motor 8B may have the same shape.

The second casing member (channel member) 9 has a separation portion 9a, a supply channel 9c, and separated supply channels (supply ports) 9e formed therein. The supply channel 9c is a channel for supplying the pressure oil to supply ports 91 of the two hydraulic motors 8A, 8B. The supply channel 9c is in communication with the common pressure oil source for the two hydraulic motors 8A, 8B, such as a hydraulic pump. The separated supply channels 9e are channels for supplying the pressure oil to the supply ports 91. The supply channel 9c is separated at the separation portion 9a into the two separated supply channels 9e. Each of the separated supply channels 9e has one end side communicating with the supply channel 9c at the separation portion 9a and the other end side that forms the supply port 91 communicating with the supply inlet 8a of the hydraulic motor 8A or 8B.

Likewise, the second casing member (channel member) 9 has a joining portion 9b, a discharge channel 9d, and separated discharge channels (discharge ports) 9f formed therein. The two separated discharge channels 9f communicate with discharge outlets 8b in the two hydraulic motors 8A, 8B. The two separated discharge channels 9f are channels for discharging the pressure oil from the discharge ports 92 in the two hydraulic motors 8A, 8B. The pressure oil discharged from the separated discharge channels 9f joins at the joining portion 9b and flows into the discharge channel 9d. The discharge channel 9d is in communication with a hydraulic oil tank or the like connected to the hydraulic pump serving as the common pressure oil source for the two hydraulic motors 8A, 8B. Each of the separated discharge channels 9f has one end side communicating with the discharge channel 9d at the joining portion 9b and the other end side that forms the discharge port 92 communicating with the discharge outlet 8b of the hydraulic motor 8A or 8B.

As shown in FIG. 3, the first casing member 87 has a substantially bottomed cylindrical shape. The first casing member 87 has a first end portion e1 from which the drive shaft 76a projects and a second end portion e2 located on the opposite side to the first end portion e1. The first end portion e1 has a first opening 88 through which the drive shaft 76a extends. The second end portion e2 has a second opening 89 for inserting the drive shaft 76a and the motive power generating unit 83 into the first casing member 87.

The second casing member (channel member) 9 has a block-like shape. The second casing member 9 is attached to the second end portion e2 of the first casing member 87 to close the second opening 89. Thus, an internal space S that can accommodate a part of the drive shaft 76a and the motive power generating unit 83 is formed between the first casing member 87 and the second casing member 9.

The first casing member 87 of the hydraulic motor 8A is attached to the +Z side of the second casing member (channel member) 9. The first casing member 87 of the hydraulic motor 8B is attached to the −Z side of the second casing member 9. Further, the second casing member 9 may have a make-up port, a make-up line, and a communication channel that communicates with these. For example, the make-up port and the make-up line can constitute a part of a hydraulic circuit. The make-up port is connected to the pressure oil source via a supply line and a control valve unit provided outside the casing 81. The make-up port is supplied with pressure oil at a predetermined pressure. In addition, a communication channel may be provided that serves as a relief passage for the oil inside the casing 81.

The supply port 91 is connected to the pressure oil source (e.g., a hydraulic pump) via a supply line and a control valve unit provided outside the channel member 9. Thus, the supply port 91 is supplied with pressure oil from the pressure oil source. The discharge port 92 is connected to the hydraulic oil tank via a discharge line provided outside the channel member 9. The pressure oil discharged from the motive power generating unit 83 flows into the discharge port 92. The discharge port 92 directs the pressure oil discharged from the motive power generating unit 83 to the discharge line.

Next, the drive shaft 76a will now be described. As shown in FIG. 3, the drive shaft (first drive shaft) 76a has a cylindrical shape. The drive shaft 76a has a part that is housed inside the casing 81 and also has an output-side end portion 76c. The output-side end portion 76c projects through the first opening 88 to the outside of the casing 81 in the +Z direction. The drive shaft 76a is rotatably supported to the casing 81 by a second bearing 85. As shown in FIGS. 2 and 3, the reduction unit 3A is disposed on the +Z side of the hydraulic motor 8A. The output-side end portion 76c of the drive shaft 76a has teeth formed in the circumferential surface thereof, and the teeth are meshed with the reduction unit 3A. The teeth of the output-side end portion 76c of the drive shaft 76a are connected with a reduction input portion 18 of the reduction unit 3A. On the −Z side of the drive shaft 76a, a support-side end portion 76g projects from an end surface 93e of a cylinder block 93 toward the second casing member 9. The support-side end portion 76g is rotatably supported to a supporting recess 9j of the second casing member 9 by a first bearing 84 (described later).

<Motive Power Generating Unit>

Next, a description is given of the motive power generating unit 83. As shown in FIG. 3, the motive power generating unit 83 is disposed inside the casing 81. The motive power generating unit 83 is disposed between the drive shaft 76a and the second casing member 9. The motive power generating unit 83 rotates the drive shaft 76a with the pressure oil supplied and discharged via the supply port 91 and the discharge port 92 of the casing 81. Specifically, the motive power generating unit 83 includes a cylinder block 93, a valve plate 94, a plurality of pistons 95, a swash plate 96, and a plurality of shoes 97.

The cylinder block 93 is disposed between the drive shaft 76a and the second casing member 9. The cylinder block 93 is shaped like a cylinder thicker than the drive shaft 76a. A through hole is formed in the radially central portion of the cylinder block 93, and the drive shaft 76a is inserted or fitted in this through hole. The outer circumferential surface of the drive shaft 76a and the inner circumferential surface of the through hole have splines. The spline of the through hole is coupled with the spline of the drive shaft 76a. Thus, the drive shaft 76a and the cylinder block 93 rotate integrally. The cylinder block 93 is not necessarily formed separately from the drive shaft 76a, but may be formed integrally with the drive shaft 76a.

The cylinder block 93 has a recess 93a formed therein so as to encircle the drive shaft 76a. The recess 93a is formed in the cylinder block 93 so as to extend from the second casing member 9 side to the spline of the through hole. The recess 93a receives a spring 93b (described later). The cylinder block 93 has a plurality of cylinder bores 98. The plurality of cylinder bores 98 are located radially outside the recess 93a in the second rotation axis C2 and are arranged in the circumferential direction. The plurality of cylinder bores 98 extend in the +Z direction. The plurality of cylinder bores 98 are arranged at regular angular intervals in the circumferential direction of the cylinder block 93 around the central axis of the cylinder block 93.

The cylinder block 93 has an end surface 93e on the −Z side. The end surface 93e faces the second casing member 9. The end surface 93e is in contact with the valve plate 94 disposed between the end surface 93e and the second casing member 9.

The spring 93b disposed in the recess 93a of the cylinder block 93 is, for example, a coil spring. The spring 93b is compressed between a retainer disposed in the recess 93a and a curved surface member 82. Therefore, the spring 93b generates a biasing force in a direction of extension by its elastic force. The biasing force of the spring 93b in the −Z direction is transmitted to the drive shaft 76a via the retainer and others. The biasing force of the spring 93b in the +Z direction is transmitted to the cylinder block 93. The curved surface member 82 is fitted on the outer circumferential surface of the portion of the drive shaft 76a located on the +Z side relative to the recess 93a.

The curved surface member 82 has a substantially spherical outer circumference on the +Z side. The outer circumference of the curved surface member 82 is smaller toward the +Z direction. The biasing force of the spring 93b is transmitted through the cylinder block 93 to the end surface of the curved surface member 82 on the −Z side. The biasing force of the spring 93b received by the curved surface member 82 is used as a stress for pressing shoe retaining members 82a (described later), which are in contact with the outer circumferential curved surface of the curved surface member 82, outward in the radial direction of the drive shaft 76a.

The valve plate 94 is disposed between the end surface 93e of the cylinder block 93 and the second casing member 9. The valve plate 94 is fixed to the second casing member 9. The valve plate 94 has a ring-like shape. The valve plate 94 includes the supply inlet 8a, which communicates with the supply port 91 of the channel member 9, and the discharge outlet 8b, which communicates with the discharge port 92 of the channel member 9.

The supply inlet 8a has an arc-like shape extending along the circumferential direction of the cylinder block 93. The supply inlet 8a communicates with several cylinder bores 98 included in the plurality of cylinder bores 98. The supply inlet 8a supplies the pressure oil supplied through the supply port 91 of the casing 81 to the cylinder bores 98. The discharge outlet 8b has an arc-like shape extending along the circumferential direction of the cylinder block 93. The discharge outlet 8b communicates with several remaining cylinder bores 98 included in the plurality of cylinder bores 98. The discharge outlet 8b directs the pressure oil discharged from the cylinder bores 98 to the discharge port 92 of the casing 81.

Each of the pistons 95 is inserted in associated one of the cylinder bores 98 of the cylinder block 93. The piston 95 can slide relative to the cylinder bore 98. When the pressure oil is supplied to the cylinder bore 98, the piston 95 moves toward the +Z direction. When the piston 95 moves toward the −Z direction, the pressure oil is discharged from the cylinder bore 98.

Each of the shoes 97 is provided at the end of associated one of the pistons 95 in the +Z direction. The end portion of the piston 95 on the +Z side has a spherical head 95a. The shoe 97 is pivotably coupled to the piston 95 via the spherical head 95a. The shoe 97 slidably contacts the swash plate 96. The plurality of shoes 97 are retained integrally by the shoe retaining member 82a. The shoe retaining member 82a rotates around the drive shaft 76a while being inclined by the curved surface member 82 along the swash plate 96. Further, the rotation of the shoe retaining member 82a causes the shoes 97 to rotate around the drive shaft 76a while being pushed toward the swash plate 96.

The swash plate 96 is provided on the +Z side of the pistons 95 and the shoes 97. The swash plate 96 is fixed to the inner surface 87a of the first casing member 87. The swash plate 96 is inclined at an angle to the drive shaft 76a.

The inclination of the swash plate 96 serves to regulate the movement of the pistons 95 along the axial direction. The swash plate 96 has an annular shape as viewed from the cylinder block 93 side located in the −Z direction. The radially central portion of the swash plate 96 has a through hole extending in the axial direction. The drive shaft 76a is inserted in (extends through) the through hole. The swash plate 96 has a flat sliding surface 96a on the cylinder block 93 side. Each of the shoes 97 is movably pressed against the sliding surface 96a.

Next, a description is given of the two bearings in the casing 81 including the channel member 9. The first bearing 84 is disposed between the circumferential surface of the supporting recess 9j of the second casing member 9 and the circumferential surface of the support-side end portion 76g of the drive shaft 76a projecting from the end surface 93e of the cylinder block 93 toward the second casing member 9. The first bearing 84 rotatably supports the cylinder block 93 to the second casing member 9. For example, the first bearing 84 is a ball bearing or a needle bearing. The first bearing 84 is not limited to these types.

The second bearing 85 is disposed between the inner surface 87a of the first casing member 87 and the circumferential surface of the output-side end portion 76c of the drive shaft 76a. The second bearing 85 rotatably supports the drive shaft 76a to the first casing member 87. For example, the second bearing 85 is a ball bearing or a tapered roller bearing. The second bearing 85 is not limited to these types.

Next, a description is given of the oil seal 86. The oil seal 86 is disposed on the +Z side of the second bearing 85. For example, the oil seal 86 is disposed between the second bearing 85 and the end portion 87e of the first casing member 87 on the +Z side. The oil seal 86 is disposed between the inner surface 88a of the first opening 88 of the first casing member 87 and the circumferential surface of the output-side end portion 76c of the drive shaft 76a. The oil seal 86 seals between the inner surface 88a of the first opening 88 of the first casing member 87 and the circumferential surface of the output-side end portion 76c of the drive shaft 76a. With this arrangement, the oil seal 86 prevents leakage of the oil from the first opening 88.

<Reduction Unit>

Figure 4:
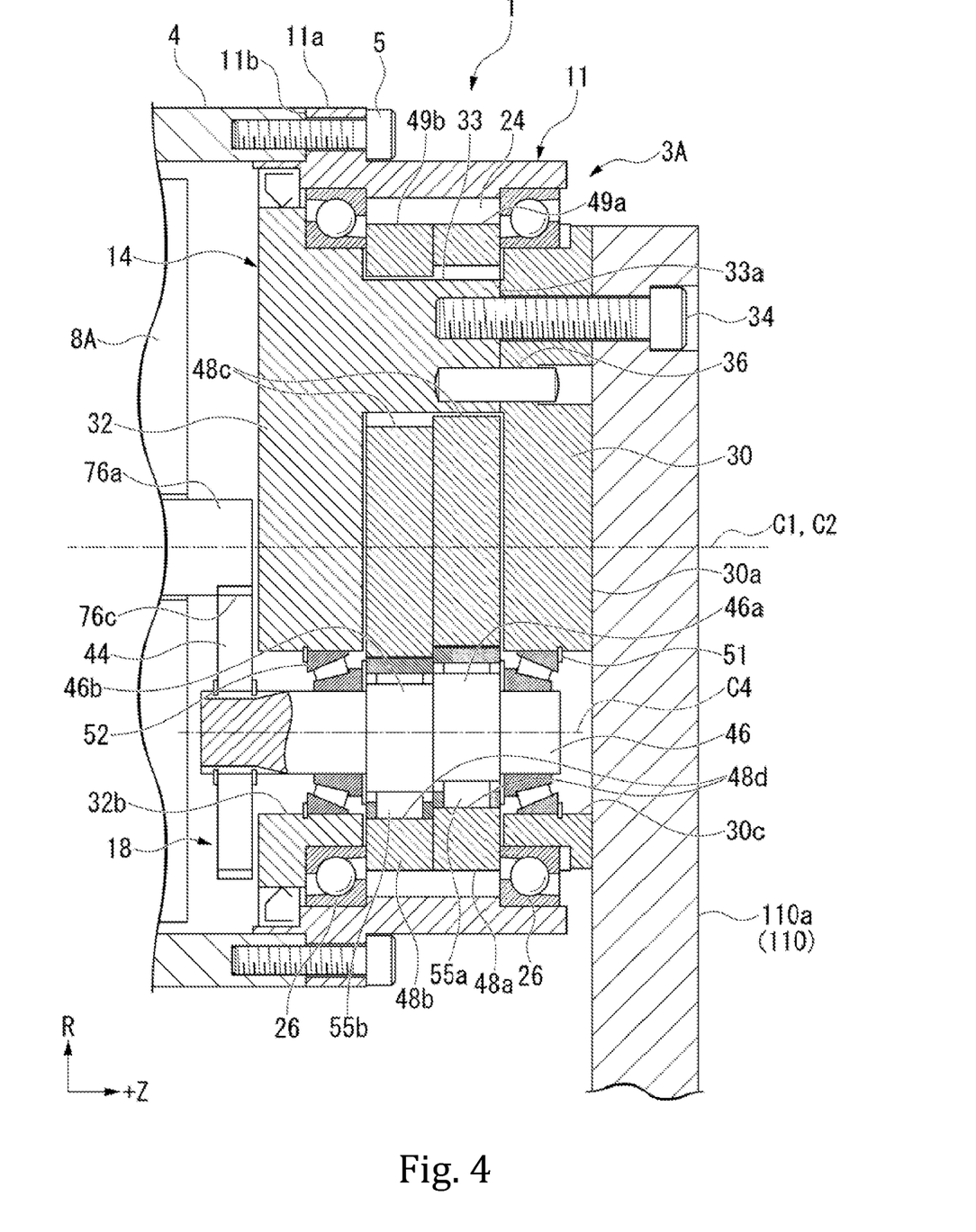
FIG. 4 schematically illustrates a configuration of a reduction unit according to the first embodiment of the disclosure.

FIG. 4 schematically shows the configuration of the first reduction unit 3A. As shown in FIG. 2, the configurations of the two reduction units 3A, 3B are the same. Further, the two reduction units 3A, 3B are arranged in symmetry with each other in the direction of the first rotation axis C1 with respect to the other end 109b of the arm 109. Therefore, in the following description, basically only the first reduction unit 3A will be described, and redundant description of the second reduction unit 3B will be hereunder omitted. As shown in FIG. 4, the first reduction unit 3A includes a case 11 having a cylindrical shape, a carrier 14 disposed radially inside the case 11, and an input portion (reduction input portion) 18 that rotates the carrier 14 at a rotation speed reduced at a predetermined ratio with respect to the rotation speed of the first drive shaft 76a.

<Case>

An outer flange portion 11a projecting outward in the radial direction is integrally formed with the outer circumferential surface of the case 11. The outer flange portion 11a has a rectangular section along the axial direction. The housing 4 is disposed on the end surface 11b of the outer flange portion 11a on the hydraulic motor 8A side (the left side in FIG. 4). The housing 4 is fastened and fixed to the outer flange portion 11a by bolts 5. Internal teeth 24 are provided on an inner circumferential surface of the case 11. The internal teeth 24 are pin-shaped (cylindrical) teeth provided on the inner circumferential surface of the case 11. Two or more internal teeth 24 are arranged at equal intervals in the circumferential direction.

<Carrier>

The carrier 14 is rotatably supported by the case 11 via a pair of main bearings (bearings) 26 disposed at a distance from each other in the axial direction. The main bearings 26 are, for example, angular contact ball bearings. The carrier 14 is positioned coaxially with the case 11 and the first rotation axis C1.

The carrier 14 includes a base plate portion 32 situated on the hydraulic motor 8A side in the axial direction, and an end plate portion 30 disposed on a side of the base plate portion 32 away from the hydraulic motor 8A, and three pillar portions 33 with a columnar shape that are integrally molded with the base plate portion 32 and protrude out from the base plate portion 32 toward the end plate portion 30. The pillar portions 33 are arranged at equal intervals in the circumferential direction. The end plate portion 30 is disposed at the distal end 33a of the pillar portions 33. The attachment bracket 110a of the bucket 110 is arranged on one surface 30a of the end plate portion 30 facing away from the base plate portion 32. The end plate portion 30 and the attachment bracket 110a are fastened and fixed to the pillar portions 33 by bolts 34. In this state, a space having a predetermined width in the axial direction is formed between the base plate portion 32 and the end plate portion 30.

A pin 36 for positioning the end plate portion 30 with respect to the base plate portion 32 is provided slightly inside the bolt 34 of the pillar portion 33 in the radial direction. The pin 36 is disposed such that it spans the pillar portion 33 and the end plate portion 30. The pillar portion 33 and the base plate portion 32 may be formed separate from each other. In this case, the pillar portion 33 is fastened to the base plate portion 32. The configuration of the pillar portions 33 is not limited to such a columnar shape. The pillar portions 33 may be formed in any shape or configuration provided that they form a space having a certain width in the axial direction between the base plate portion 32 and the end plate portion 30.

The end plate portion 30 and the base plate portion 32 have a plurality (for example, three in this embodiment) of through holes 30c and 32b, respectively, into which crankshafts 46 (described later) of the reduction input portion 18 are inserted. The through holes 30c and through holes 32b are arranged at equal intervals in the circumferential direction.

<Reduction Input Portion>

The reduction input portion 18 includes two or more (for example, three in this embodiment) transmission gears 44 that mesh with the teeth of the output-side end portion 76c of the first drive shaft 76a, two or more (for example, three in this embodiment) crankshafts 46 each having one end fixed to one of the transmission gears 44, a first external gear (external teeth member) 48a and a second external gear (external teeth member) 48b that rotate oscillatorily with the rotation of the crankshafts 46.

Since the transmission gears 44 are fixed to one end of the crankshafts 46, the rotation of the first drive shaft 76a is transmitted to the crankshafts 46 via the transmission gears 44. The crankshafts 46 extend along the axial direction. In other words, each of the crankshafts 46 rotates about a crank rotation axis C4 (an example of the other rotation axis in the claims) parallel to the second rotation axis C2. The crankshaft 46 is rotatably supported by the end plate portion 30 via a first crank bearing 51. The crankshaft 46 is also rotatably supported by the base plate portion 32 via a second crank bearing 52. The first crank bearing 51 and the second crank bearing 52 are, for example, tapered roller bearings.

At the center of the crankshaft 46 in the axial direction, there are provided a first eccentric portion 46a and a second eccentric portion 46b disposed eccentrically from the axis of the crankshaft 46. The first and second eccentric portions 46a, 46b are disposed adjacent to each other in the axial direction between the first crank bearing 51 and the second crank bearing 52. The first eccentric portion 46a is disposed adjacent to the first crank bearing 51. The second eccentric portion 46b is disposed adjacent to the second crank bearing 52. Further, the first eccentric portion 46a and the second eccentric portion 46b are out of phase with each other. The crankshaft 46 thus configured is inserted into the through holes 30c and 32b in the end plate portion 30 and the base plate portion 32, respectively. Thus, the crankshafts 46 are arranged at equal intervals in the circumferential direction like the through holes 30c and 32b.

A first roller bearing 55a is attached to the first eccentric portion 46a of the crankshaft 46. A second roller bearing 55b is attached to the second eccentric portion 46b. The first roller bearing 55a is, for example, a cylindrical roller bearing. In this case, the first roller bearing 55a includes a plurality of rollers and a cage for holding the plurality of rollers. The second roller bearing 55b has the same configuration as the first roller bearing 55a. The first external gear 48a and the second external gear 48b are oscillatorily rotated in conjunction with the rotation of the crankshafts 46 via the roller bearings 55a and 55b.

The first and second external gears 48a, 48b are disposed in a space between the base plate portion 32 and the end plate portion 30 of the carrier 14. The first external gear 48a and the second external gear 48b have external teeth 49a and 49b, respectively, that mesh with the internal teeth 24 of the casing 11. In the first external gear 48a and the second external gear 48b, there are formed first through holes 48c into which the pillar portions 33 are inserted, and second through holes 48d into which the eccentric portions 46a and 46b of the crankshafts 46 are inserted.

The first eccentric portion 46a of the crankshaft 46 and the first roller bearing 55a are inserted into the second through hole 48d of the first external gear 48a. The second eccentric portion 46b of the crankshaft 46 and the second roller bearing 55b are inserted into the second through hole 48d of the second external gear 48b. The first eccentric portion 46a and the second eccentric portion 46b are oscillatorily rotated by the rotation of the crankshaft 46, and thus the first external gear 48a and the second external gear 48b are oscillatorily rotated while they mesh with the internal teeth 24 of the case 11.

<Operation of Drive Device>

Next, a description is given of operation of the drive device 1.

<Operation of Hydraulic Motors>

In this case, the pressure oil is supplied from the hydraulic pump or the like serving as the pressure oil source to the drive device 1 provided on the arm 109. As shown in FIG. 3, the pressure oil supplied flows through the supply channel 9c and separates at the separation portion 9a into the two separated supply channels 9e, and then the pressure oil is supplied to the supply inlets 8a of the hydraulic motor 8A and the hydraulic motor 8B via the respective supply ports 91. Since the pressure oil is separated at the separation portion 9a into the two separated supply channels 9e, the hydraulic motor 8A and the hydraulic motor 8B can be driven simultaneously. At the same time, the hydraulic oil discharged from the discharge outlets 8b of the hydraulic motor 8A and the hydraulic motor 8B into the respective separated discharge channels 9f joins at the joining portion 9b. The hydraulic oil that has joined together flows through the discharge channel 9d and returns to the hydraulic oil tank or the like connected to the hydraulic pump serving as the common pressure oil source.

A description is given of operation of the motive power generating unit 83. The following describes operation of the first hydraulic motor 8A among the two hydraulic motors 8A, 8B. The cylinder bore 98 for the piston 95 at the position immediately after the dead center on the −Z side is in communication with the supply inlet 8a of the valve plate 94. Thus, the cylinder bore 98 receives the pressure oil from the supply inlet 8a of the valve plate 94. The piston 95 in the cylinder bore 98 that has received the pressure oil is moved toward the +Z direction by the pressure oil. This causes the shoe 97 provided on the distal end portion of the piston 95 to be pressed against the swash plate 96. When the shoe 97 is pressed against the swash plate 96, a part of the reaction force generated at that time acts on the cylinder block 93 for rotating the cylinder block 93. Thus, the cylinder block 93 and the drive shaft 76a rotate.

On the other hand, the cylinder bore 98 for the piston 95 that has moved to the position immediately after the dead center on the +Z side communicates with the discharge outlet 8b of the valve plate 94. Thus, the cylinder bore 98 is allowed to discharge the pressure oil to the discharge outlet 8b of the valve plate 94. At this time, the piston 95 is pushed toward the −Z direction by the swash plate 96 as the cylinder block 93 rotates. Thus, the piston 95 moves toward the −Z direction while discharging the pressure oil from the cylinder bore 98. The piston 95 then returns to the dead center on the −Z side.

<Operation of Reduction Unit>

In the drive device 1, the rotation of the drive shaft 76a in the hydraulic motor 8A is transmitted to the reduction input portion 18 of the reduction unit 3A connected with the teeth of the output-side end portion 76c of the drive shaft 76a. Likewise, the rotation of the drive shaft 76b in the hydraulic motor 8B is transmitted to the reduction input portion 18 of the reduction unit 3B connected with the teeth of the output-side end portion 76c of the drive shaft 76b. The operation of the first reduction unit 3A among the two reduction units 3A, 3B will be now described.

As shown in FIGS. 3 and 4, in the first reduction unit 3A, each of the transmission gears 44 that mesh with the first drive shaft 76a is rotated by the rotation of the first drive shaft 76a. Thus, the crankshaft 46 is rotated integrally with the transmission gear 44 about the crank rotation axis C4. When the crankshaft 46 is rotated, the oscillation of the first eccentric portion 46a causes the first external gear 48a to rotate while meshing with the internal teeth 24. In addition, the oscillation of the second eccentric portion 46b causes the second external gear 48b to rotate while meshing with the internal teeth 24. That is, the crankshaft 46 rotates about the crank rotation axis C4 and revolves around the first rotation axis C1.

In the present embodiment, each of the pillar portions 33 penetrating the first through hole 48c of the external gears 48a, 48b is fixed in a predetermined position together with the base plate portion 32. Therefore, the carrier 14 is rotated about the first rotation axis C1 relative to the case 11 at a rotation speed lower than that of the first drive shaft 76a. The other end 109b of the arm 109 in the longitudinal direction is fixed to the case 11 via the housing 4. The attachment bracket 110a of the bucket 110 is fixed to the end plate portion 30 of the carrier 14. Thus, driving the hydraulic motors 8A, 8B provided on the arm 109 causes the bucket 110 to rotate about the first rotation axis C1 relative to the arm 109.

As described above, in the drive device 1 of the embodiment, the crankshafts 46 of the reduction units 3A, 3B serve as input shafts to which the rotation of the drive shafts 76a, 67b of the hydraulic motors 8A, 8B is input. The drive shafts 76a, 76b are substantially coupled to the input shafts of the reduction units 3A, 3B. The carrier 14 serves as the output shaft that decelerates the rotation of the drive shaft 76a, 76b and outputs the decelerated rotation to the bucket 110.

The rotation of the drive shaft 76a of the hydraulic motor 8A is transmitted to the reduction unit 3A. Likewise, the rotation of the drive shaft 76b of the hydraulic motor 8B is transmitted to the reduction unit 3B. Therefore, the outputs of these two reduction units 3A, 3B are transmitted to the bucket 110. Meshing timings of the components in the two hydraulic motors 8A, 8B and the two reduction units 3A, 3B may differ due to a slight formation error of the components and an assembly error. Therefore, at the time of an initial operation of the drive device 1, the drive shafts 76a, 76b coupled to the reduction units 3A, 3B respectively may receive different loads. In such a case, there is a possibility that the hydraulic motors 8A, 8B and the reduction units 3A, 3B continue to be driven with the load imbalance.

However, in the drive device 1 of the embodiment, the hydraulic oil can be separated in the channel member 9 disposed close to the hydraulic motors 8A, 8B and supplied to the hydraulic motors 8A, 8B, which can be driven separately in the axial direction. This allows for the absorption of the different loads on the drive shafts 76a, 76b. Thereafter, the loads can be equally applied to the drive shafts 76a, 76b, and the rotation of the hydraulic motors 8A, 8B can be transmitted to the reduction units 3A, 3B in this state. Further, the hydraulic motors 8A, 8B separately drive the reduction units 3A, 3B, thereby balancing the rotational driving force. Therefore, differences in load sharing can be inhibited from occurring, and the loads can be equalized between the opposite sides of the arm 109. This allows the output to the bucket 110 to be balanced between the opposite sides of the arm 109. Accordingly, the stability and efficiency in operation can be increased. Simultaneously, it is possible to prevent the reduction units 3A, 3B from continuing to be driven with the load imbalance. As a result, the product life of the drive device 1 can be extended.

The reduction units 3A, 3B each include the case 11 having a cylindrical shape, the carrier 14 disposed radially inside the case 11, and the reduction input portion 18 that rotates the carrier 14 at a rotation speed reduced at a predetermined ratio with respect to the rotation speed of the drive shafts 76a, 76b that serve as the input shaft. The reduction input portion 18 includes the two or more crankshafts 46, and the first external gear 48a and second external gear 48b that oscillatorily rotate in conjunction with the rotation of the crankshafts 46. With such two reduction units 3A, 3B, a high output can be obtained at a high reduction ratio.

Simultaneously, the two hydraulic motors 8A, 8B are disposed coaxially between the two reduction units 3A, 3B, and therefore, it is possible to reduce the size of the drive device 1 and allow the boom 108, the arm 109, and the bucket 110 to operate appropriately. Further, in the reduction units 3A, 3B, the internal teeth 24 and the external gears 48a, 48b have a high contact ratio to each other, which improves the resistance of the drive device 1 against overloads and impact loads. Consequently, it is possible to improve the resistance against overloads and impact loads on the coupling portion between the slewable upper structure 103 and the boom 108, the coupling portion between the boom 108 and the arm 109, and the coupling portion between the arm 109 and the bucket 110.

Second Embodiment

Figure 5:
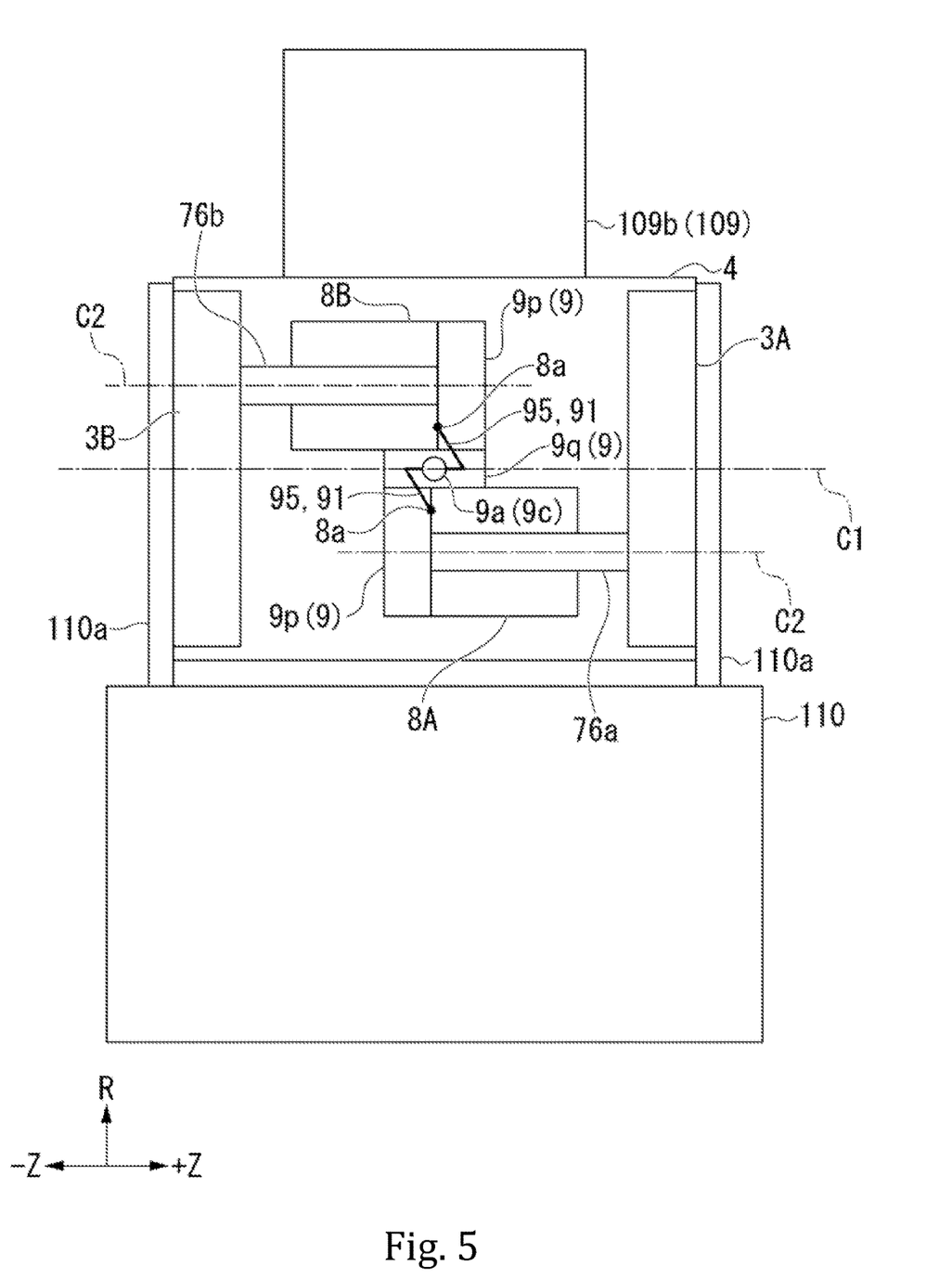
FIG. 5 schematically illustrates a drive device in a coupling portion between an arm and a bucket according to a second embodiment of the disclosure.

The following describes a drive device and a construction machine relating to a second embodiment of the disclosure with reference to the accompanying drawings. FIG. 5 schematically illustrates the drive device relating to the embodiment. The second embodiment is different from the above-described first embodiment in terms of the arrangement of the hydraulic motors and the channel member. For the present embodiment, the same constituents as in the first embodiment described above are denoted by the same reference numerals and are not described here.

As shown in FIG. 5, in this embodiment, the hydraulic motors 8A, 8B are arranged such that the rotation axis C2 of the hydraulic motor 8A and the rotation axis C2 of the hydraulic motor 8B are spaced apart from the first rotation axis C1 of the reduction units 3A, 3B. Further, the channel member 9 includes a cover 9p and a channel portion 9q. The cover 9p closes the second opening 89 in the casing 81 of the hydraulic motor 8A, and the channel portion 9q has the supply channel 9c and the separation portion 9a formed therein. In the channel portion 9q, the separation portion 9a is formed in proximity to the first rotation axis C1. The separated supply channels 9e are each formed through the cover 9p and the channel portion 9q. The supply ports 91 are each formed in the cover 9p.

The supply port 91 of the hydraulic motor 8A and the supply port 91 of the hydraulic motor 8B are symmetrically arranged in the circumferential and radial directions of the first rotation axis C1. The supply port 91 of the hydraulic motor 8A is located on the −Z side relative to the supply port 91 of the hydraulic motor 8B, and the supply port 91 of the hydraulic motor 8B is located on the +Z side relative to the supply port 91 of the hydraulic motor 8A.

In this embodiment, the hydraulic motor 8A and the hydraulic motor 8B are arranged symmetrically in the circumferential direction and the radial direction with respect to the first rotation axis C1. The reduction units 3A, 3B may each have the reduction input portion 18 formed of gears and other parts that mesh with the transmission gears 44 and the drive shaft 76a, 76b.

In this embodiment, the reduction units 3A, 3B and the bucket 110 have the same first rotation axis C1, as in the first embodiment described above. Further, the hydraulic motors 8A, 8B are not aligned with each other in the R direction. Therefore, for the same size of the hydraulic motors 8A, 8B as in the first embodiment described above, the distance between the reduction units 3A, 3B in the direction of the first rotation axis C1 can be smaller. Therefore, the distance between the attachment brackets 110a in the direction of the first rotation axis C1 can be smaller. This allows the drive device 1 to be downsized and space-saving in the direction of the first rotation axis C1.

This embodiment produces the same advantageous effects as the first embodiment described above.

In the embodiments disclosed herein, a member formed of multiple components may be integrated into a single component, or conversely, a member formed of a single component may be divided into multiple components. Irrespective of whether or not the components are integrated, they are acceptable as long as they are configured to attain the object of the invention.

What is claimed is:

1. A drive device comprising:
two fluid motors serving as drive sources for generating rotational forces; and
a channel member having a supply channel for supplying a pressure fluid to the two fluid motors,
wherein each of the two fluid motors includes:
a casing having a supply port and a discharge port for the pressure fluid;
a drive shaft rotatably supported to the casing; and
a motive power generating unit provided in the casing and configured to rotate the drive shaft with the pressure fluid, the pressure fluid being supplied to the motive power generating unit through the supply port and discharged from the motive power generating unit through the discharge port,
wherein the two fluid motors are arranged such that the respective drive shafts are disposed parallel to each other and oriented toward opposite sides along rotation axes of the drive shafts,
wherein the channel member includes two separated supply channels configured to supply the pressure fluid to the supply ports of the two fluid motors,
wherein the two separated supply channels each have a first end in communication with the supply channel and a second end forming the supply port, and wherein the supply channel supplies the pressure fluid supplied from a common supply source through each of the separated supply channels to the supply ports of the two fluid motors.

2. The drive device of claim 1, further comprising:

two reduction units each including an input portion and an output shaft, the input portion being coupled to associated one of the two fluid motors, the output shaft being configured to decelerate rotation of the input portion and output the decelerated rotation, wherein the two reduction units are arranged such that respective rotation axes are coaxial, and the two reduction units are spaced apart from each other.

3. The drive device of claim 2, wherein the drive shafts of the two fluid motors are coaxial, and wherein the supply ports of the two fluid motors are opposed to each other along the rotation axes of the drive shafts.

4. The drive device of claim 3, wherein the channel member serves as a part of the casings of the two fluid motors.

5. The drive device of claim 1, wherein the drive shafts of the two fluid motors are coaxial, and wherein the supply ports of the two fluid motors are opposed to each other along the rotation axes of the drive shafts.

6. The drive device of claim 5, wherein the channel member serves as a part of the casings of the two fluid motors.

7. A construction machine comprising:

a first member having two fluid motors serving as drive sources for generating rotational forces;

a second member coupled to the first member so as to be rotatable about a rotation axis;

two reduction units; and a channel member, wherein each of the two fluid motors includes:

a casing having a supply port and a discharge port for a pressure fluid;

a drive shaft rotatably supported to the casing; and a motive power generating unit provided in the casing and configured to rotate the drive shaft with the pressure fluid, the pressure fluid being supplied to the motive power generating unit through the supply port and discharged from the motive power generating unit through the discharge port, wherein the two reduction units each have a main axis coaxial with the rotation axis, the two reduction units are spaced apart from each other in a direction along the rotation axis, and the two reduction units are configured to transmit the rotational forces from the two fluid motors to the second member, wherein the channel member is disposed between the two reduction units in the direction along the rotation axis, the channel member is disposed between the two fluid motors in the direction along the rotation axis, and the channel member has a supply channel for supplying the pressure fluid to the two fluid motors, wherein the channel member includes two separated supply channels configured to supply the pressure fluid to the supply ports of the two fluid motors, wherein the two separated supply channels each have a first end in communication with the supply channel and a second end forming the supply port, wherein the supply channel supplies the pressure fluid supplied from a common supply source through each of the separated supply channels to the supply ports of the two fluid motors, and wherein the supply ports of the two fluid motors are opposed to each other along rotation axes of the drive shafts.

8. The construction machine of claim 7, further comprising:

a self-propelled undercarriage;

a slewable upper structure provided on top of the undercarriage via a slewing mechanism and configured to slew relative to the undercarriage; and an operating unit provided on and coupled to the slewable upper structure so as to be rotatable by a rotating unit about a first rotation axis extending in a horizontal direction, wherein the operating unit includes a plurality of members coupled to each other so as to be rotatable by the rotating unit about a rotation axis parallel to the first rotation axis, and the first member and the second member are selected from the plurality of members coupled to each other by the rotating unit.

* * * * *